United States Patent Office 3,467,344
Patented Sept. 16, 1969

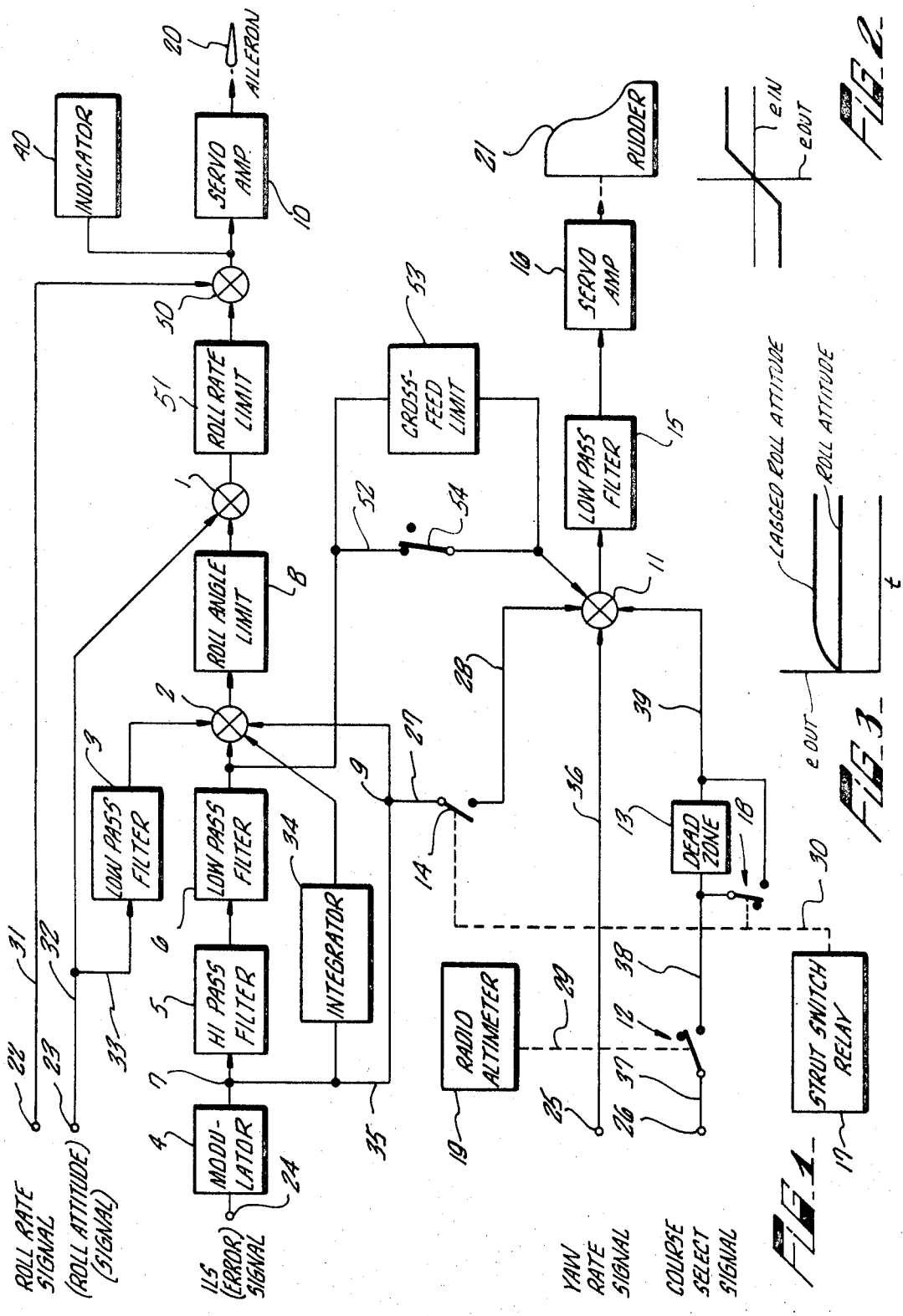

3,467,344
AUTOMATIC LANDING CONTROL SYSTEM HAVING IMPROVED WIND SHEAR CAPABILITY
Kenneth C. Kramer, Thousand Oaks, and Don M. Archibald, Malibu, Calif., assignors to Lear Siegler, Inc., Santa Monica, Calif., a corporation of Delaware
Filed Aug. 25, 1967, Ser. No. 663,278
Int. Cl. B64d 45/04; G01s 1/16; G05b 5/01
U.S. Cl. 244—77                                            18 Claims

ABSTRACT OF THE DISCLOSURE

The invention disclosed by one representative embodiment herein includes an automatic roll and yaw control system for an aircraft wherein a command signal for controlling movement of the aircraft about its roll axis includes an electrical command signal which is the algebraic summation of a filtered roll attitude signal, a beam displacement signal, an integral of beam displacement, and a beam rate signal. This roll axis command signal is limited first by a roll angle limit circuit. The limited roll axis command term is opposed by the direct application of a roll attitude signal which is proportional to the aircraft's response to a roll axis command. The resultant signal between the roll attitude response signal and the limited roll axis command term is limited next by a roll rate limit circuit. This limited roll rate command is opposed by the direct application of a roll rate signal proportional to the rate of response by the aircraft about its roll axis. Further described in the one representative embodiment herein, is the continual application of a beam rate term to the yaw control axis of the automatic landing system wherein it is summed with a yaw rate signal for controlling the aircraft's rudder.

Background of the invention

*Field of the invention.*—The field of this invention includes automatic control systems for airborne vehicles and in one illustrative embodiment disclosed herein, the field of this invention is directed to an improved automatic landing system for aircraft at runway locations which are subjected to strong and variable crosswinds.

*Description of the prior art.*—Automatic landing systems are, of course, well known in the prior art. In general, such systems employ as one input term for the roll and/or yaw axis, a course select error signal. In Patent 3,399,850, a system is disclosed wherein the course select error signal is eliminated until the aircraft has essentially touched down on the landing area, and the elimination of the course select error signal yields a highly stabilized approach throughout a wide range of crosswinds. In prior art control systems, such strong crosswinds either tend to move the aircraft off from beam center, or develop a large error signal as the crosswinds are encountered. A large error signal commands an abrupt movement which causes alarm to both passengers and pilot in that such abrupt commands often occur at low altitudes relative to the runway.

Summary of the invention

The foregoing disadvantages of the prior art are avoided in accordance with the principles of this invention, wherein an automatic landing system for aircraft is equipped with a roll and a yaw axis control circuit combination, which is to be used in connection with a beam transmitted from a landing area. The roll axis control circuit comprises a first summing junction for producing an electrical signal which is derived from a signal proportional to the displacement of the aircraft from the beam and from a signal proportional to a lagged roll attitude of the aircraft relative to its roll axis. A roll angle limit circuit is connected to the first summing junction for passing a command which is limited as to the amount of roll angle that can be commanded. A second summing junction is connected to the roll angle limit circuit and is adapted to receive a directly applied roll attitude signal for modifying the command which has been roll angle limited. A roll rate limit circuit is connected to the second summing junction, and this roll rate limit circuit passes a command signal which is limited as to the amount of roll rate which can be commanded. A third summing junction is connected to the roll rate limit circuit and is adapted to receive a directly applied roll rate signal for modifying the roll rate limited command. The output signal from the third summing junction is available at a roll axis control for controlling movements of said aircraft about its roll axis. An additional stabilizing signal is applied to the yaw axis control circuit in the form of a beam rate signal. This beam rate signal turns the rudder so as to anticipate a departure and turn the aircraft in opposition to that departure.

Brief description of the drawing

FIGURE 1 depicts in block diagram form an automatic landing system in accordance with the principles of this invention;

FIGURE 2 depicts a wave-form characteristic illustrative of limit circuits depicted in block form in FIGURE 1; and FIGURE 3 depicts a wave-form characteristic illustrative of the lagged roll attitude component in the roll axis command channel.

Description of the preferred embodiment

Turning now to FIGURE 1, an automatic landing system in accordance with the present invention includes a localizer, or ILS, error signal receiving terminal 24. This ILS error signal, as is well known, has an amplitude and a polarity (or phase) indicative of the amount and direction of aircraft displacement relative to an ILS beam center, which beam is established by a transmitting generator located on the landing area. Also present in the roll axis control circuit of the landing system is a terminal 22 for receiving a roll rate signal and a terminal 23 for receiving a roll attitude signal, both proportional to movements of the aircraft relative to its roll axis.

The roll rate signal from terminal 22 is fed to summing junction 50 through conductor 31. The roll attitude signal from terminal 23 is fed to two points. One portion of the roll attitude signal is fed directly to summing junction 1 through conductor 32. The other portion of the roll attitude signal is fed through conductor 33 and low pass filter 3 to summing junction 2. The output from low pass filter 3 provides a lagged roll attitude damping signal. FIGURE 3 depicts the wave-form for the combined lagged roll attitude and roll attitude signals present in the roll axis command channel. This novel circuit feature is distinguished over known prior art filters employed in roll axis command channels in that the output signal is a continuing damping signal which aids greatly in improving aircraft stability, particularly as the aircraft nears the approach end of the runway. Other filter arrangements known in the prior art normally rise to a peak value and drop to zero with time such that damping diminishes with resultant hunting about the beam, particularly as the aircraft is near the approach end of the runway. Of course, the wave-form of FIGURE 3 will ultimately diminish to zero when the aircraft has responded to the command, however, the lagged roll and roll attitude command is effective for longer durations and improves stability.

The ILS error signal fed in at terminal 24 has an amplitude proportional to the angular displacement of the aircraft from the center or equipotential line of the localizer beam approach to the runway. The phase or polarity of the signal corresponds to the side of equipotential line on which the aircraft is positioned. When the ILS error signal fed in at terminal 24 is a DC signal, it is modulated in unit 4 to provide an AC signal at common terminal point 7. If the aircraft is on the ILS beam center, the ILS error signal is zero. If the aircraft tends to move out of the ILS beam center, the ILS error signal will command aileron 20 to move the aircraft back to ILS beam center.

A portion of the ILS error signal is fed from common terminal 7 through conductor 35 directly to summing junction 2. The ILS error signal is also applied to add circuit 2 through an integrator 34 of any known prior art type. For example, a typical mechanical integrator is shown in FIGURE 6 of U.S. Patent No. 3,136,502 assigned to the same assignee as the present application.

Inasmuch as most commercially feasible systems include some unbalance between the various components, steady direct current or alternating current errors may be present even though the aircraft is, in fact, on beam center. Such error signals from system unbalance would be erroneously interpreted as though the aircraft is off beam center, and would result in a constant offset from the beam. Integrator 34 protects against any such offset induced through system unbalance by providing a long-term correction signal.

The ILS error signal is also fed through high pass filter 5 to provide a signal proportional to the rate of change of the ILS error signal in a manner well known in the art. The derived rate output signal from high pass filter 5 is fed to low pass filter 6. The output from the filter 6, representing a filtered derived rate signal proportional to the rate of change of the ILS error signal, is fed to summing junction 2 where it is algebraically summed with the directly applied ILS error signal (from terminal 7), with the output signal from low pass filter 3, and with the output from integrator 34. The shaped beam rate signal from filters 5 and 6 is a command term which tends to alter the directly applied ILS beam error signal. The shaped beam rate term either aids or opposes the ILS beam error signal. Thus, if the aircraft is on beam center and starts to deviate therefrom, the rate of change away from the beam signal is a command term to keep the aircraft on the beam center. If the aircraft has stabilized at a position other than ILS beam center, then the directly applied ILS error signal moves it back and the rate of change of the aircraft toward beam center opposes the ILS error signal so that the aircraft does not overshoot ILS beam center.

The output signal from summing junction 2 is passed through limit circuit 8 to summing junction 1. Limit 8 limits the voltage of the output signal therefrom to a predetermined magnitude and thereby limits the maximum bank, or roll, angle that the aircraft will be subjected to in response to an ILS error signal. One embodiment by which this is accomplished is disclosed in the description of limit #1 in the specification and in FIGURE 4 of the aforementioned United States Patent No. 3,136,502.

Summing junction 1 algebraically sums the roll attitude signal from input terminal 23 and the output signal from limit circuit 8. The roll attitude signal thus tends to null out the command term from limit circuit 8 as the aircraft responds to the command for returning it to ILS beam center.

Low pass filter 3 emits a lagged roll attitude signal which, being of the same polarity (and/or phase) as the roll attitude signal, tends to decrease the amount of roll attitude after an amount of time determined by the time constant of filter 3. Thus, low pass filter 3 is a long-term roll attitude correction which decreases the amount of commanded roll attitude and thus stabilizes the aircraft's movements relative to beam center.

The output signal from summing junction 1 is applied through another limit circuit 51 to summing junction 50. The output from summing junction 1 is a roll rate command signal, whereas the roll rate signal received at terminal 22 tends to null out the command signal as the aircraft responds to the command. As shown in FIGURE 2 the limit circuit 51 may have a linear output for any given input less than a predetermined limit value, and for inputs above the predetermined limit value a constant output is emitted. Thus, if the aircraft in moving toward the beam center, tries to roll faster than the permitted rate of roll defined by limit circuit 51, then the excess signal on line 31 opposes that roll in that it has a polarity (or phase) in opposition to the roll command. The limited roll rate of this invention allows rapid response of the aircraft, and at the same time assures that the rate of roll is within acceptable limits for the safety, comfort, and assurance of both pilots and passengers.

The novel circuit operation described hereinbefore assures that the roll axis circuit keeps the aircraft in ILS beam center, with its wings level. Furthermore, the aircraft may, due to crosswinds, have a crab angle in that no heading error is present in the roll axis circuit of this invention either as a command or as a damping term. The output from summing junction 50 is fed to the autopilot servo amplifier 10 and to indicator 40. The output from the servo amplifier 10 is fed to an actuator (not shown) which actuates the ailerons 20 on the aircraft in a manner such as to provide the proper bank angle in order to bring the aircraft back to the center of the ILS beam and to reduce the ILS error signal to zero. For manual control the servo amplifier 10 may be selectively deactivated. In such an instance, the signal to the indicator drives a steering bar on the indicator allowing the pilot to maneuver the aircraft manually in a manner to keep the steering bar centered and thereby be assured that the aircraft is following the beam center or a computed path to return the aircraft to beam center if displaced.

The yaw rate signal from terminal 25 is fed to summing junction 11 and the output signal from the latter is fed to low pass filter 15. The output signal from low pass filter 15 is fed to servo amplifier 16. The output signal from the latter is fed to a rudder actuator (not shown) which actuates rudder 21 to provide yaw damping control. Thus, the yaw axis provides a yaw damping function to assist the roll axis in controlling the aircraft in the center of the beam without instability normally encountered in many automatic landing systems.

As mentioned in the above-referenced Patent 3,136,502, the gain of the yaw axis may be set at an unusually high value. As a consequence of such high gain, the yaw axis control tends to oppose any turning of the aircraft which automatically is expected due to movements about the roll axis. The resultant is a pseudo sideslip control which slips the aircraft toward the center of the beam which means that beam error corrections can be accomplished quickly and smoothly.

The above mentioned high gain value we have discovered, may be set at a lower value by cross-feeding beam rate to the yaw axis control in a novel manner which still anticipates a deviation of the aircraft from beam center, and quickly compensates for such deviation by steering the aircraft to beam center through a commanded displacement of the rudder. This steering maneuver to beam center readily occurs without any noticeable change in roll attitude being apparent to passengers and pilots.

Further, we have discovered that certain well-known aircraft inertia and control system sluggishness may be compensated for by adding a signal proportional to beam rate into the yaw axis control. Accordingly, lead 52 directly and continually applies the beam rate signal passed by the tandem connected filters 5 and 6 into the yaw axis summing junction 11. The shaped beam rate signal from filter 6 is preferred; however, lead 52 may be connected between filters 5 and 6 with advantageous results. Thus, we have discovered that this beam rate term in the yaw axis moves the rudder in a direction which opposes any beam error signal as it starts to build up, thereby, cancelling out any significant deviation from beam center, and presenting an increased automatic landing performance in the presence of strong and variable crosswinds.

If the rudder activity becomes excessive due to the presence of large ILS error signals, such excessive activity can be eliminated by the optional technique of substituting a cross-feed limit circuit 53 for lead 52 through the selective opening of switch 54, either manually or automatically. Cross-feed limit circuit 53 may have the same operational characteristics as those shown in FIG. 2 in that it passes a beam rate signal into the yaw axis control up to a predetermined level. Thereafter, no further yaw axis control activity resulting from beam rate cross-feed is experienced for beam rate signals above that predetermined level.

Prior art systems in which only roll axis control is predominant tend to exhibit a low frequency oscillation of the aircraft as it hunts back and forth across beam center. This oscillation is readily apparent to pilots and passengers and leads to serious concern as to the stability and operativeness of the automatic landing system. Such problems both in approach and throughout touchdown to a parking area are eliminated by the application of the roll rate term into summing junction 11 of the yaw axis control of our invention.

When the aircraft has descended to a predetermined altitude (15 feet in one system embodiment, for example) during the landing procedure, switch 12 is closed by radio altimeter 19 through means 29 which can be either electrical or mechanical. When switch 12 is closed, the course select signal from terminal 26 is passed therethrough and through dead zone 13 to add circuit 11. Dead zone or suppressing means 13 is preset to restrict or prevent the passage of signals below a predetermined magnitude, that is, dead zone 13 permits signals in excess of a given magnitude only to pass to the summing junction 11. The course select signal is combined in summing junction 11 with the yaw rate signal from terminal 25. Thus, below a predetermined altitude, when switch 12 is closed, the rudder is controlled by the combination of yaw rate signal and course select signal.

An example of a dead zone circuit is given in the above referred to Patent 3,136,502. The magnitude of the signal portion that is restricted is different for different aircraft. In a non-limiting example in one craft, the breakdown voltage of the dead zone was set at 500 millivolts. In this craft, such a breakdown voltage would permit a signal in excess of a signal magnitude equivalent to a 4 degree error in heading, to pass through to summing junction 11 and to control rudder 21 and cause the aircraft to slip so as to reduce the heading error to 4 degrees. In other words, a crab angle of 4 degrees is permissible on landing for the aircraft in this example. Heading errors on landing of greater or less than 4 degrees are permissible for other aircraft and the dead zone will accordingly be set to provide for an appropriate breakdown voltage.

From the above, it is seen that the combined signal which is fed from summing junction 50 to the aileron actuating mechanism is for the purpose of banking the aircraft to bring it back to the center of the landing beam. The combined signal from summing junction 11, controls the yaw attitude of the aircraft so as to keep it aligned with the runway heading below a predetermined aircraft altitude.

At touchdown, a strut switch (not shown) energizes a relay 17 which closes switches 14 and 18 through means 30. Switch 18 shorts out the dead zone circuit 13 and permits the course select signal from terminal 26 to pass directly to summing junction 11 through conductor 37, switch 12, conductor 38, switch 18 and conductor 39. Switch 14 permits the ILS error signal to pass to summing junction 11 through conductor 35, common terminal 9, conductor 27, switch 14 and conductor 28. On touchdown, therefore, the ILS error signal is combined with the yaw rate gyro signal, the beam rate signal, and the course select signal. Consequently, during the aircraft roll-out after landing, the ILS error signal is applied to the yaw channel where it and beam rate signal become the predominant signal and the aircraft is guided down the center of the runway by the ILS localizer signal.

In one aircraft, for example, high pass filter 5, and low pass filter 6, each had a time constant of one second; low pass filter 3 had a time constant of 6 seconds; low pass filter 15 had a time constant of 0.1 second; dead zone 13 had a breakdown voltage of 500 millivolts and limiter 8 was designed to allow a maximum roll angle of 6 degrees. The value given in this example is illustrative only and is not to be taken by way of limitation since lateral control systems for different aircraft have different values depending on the design characteristics of the craft.

The control system described herein has been used with a conventional automatic pilot on an aircraft and it was found that the aircraft, upon landing, was held closer to the beam center than had been possible with prior art controls.

Although this invention has been described in detail with reference to specific examples, it is not intended that the invention should be limited by the above description or drawings, but is to be limited only by the spirit and scope of the appended claims.

What is claimed is:

1. An automatic landing system for an aircraft having assigned thereto a roll and a yaw axis and including signal emitting means on said aircraft for emitting a plurality of signals including roll attitude signals and yaw rate signals, said landing system adapted for use in conjunction with a beam transmitted from a landing area, said landing system comprising:

means for emitting beam displacement signals indicative of the direction and amount of displacement of said aircraft from beam center when approaching said landing area;

first means for deriving from said beam displacement signal a rate of beam displacement signal;

a summing junction for combining said beam displacement signals with said beam rate displacement signals and said roll attitude signals to form a composite roll command signal for said aircraft; and second means for deriving a yaw axis command for said aircraft, which yaw axis command includes said yaw rate signal as modified by said derived beam rate signal.

2. An automatic landing system for an aircraft having assigned thereto a roll and a yaw axis and including signal emitting means on said aircraft for emitting a plurality of signals including roll attitude signals, and yaw rate signals, said landing system adapted for use in conjunction with a beam transmitted from a landing area, said landing system comprising:

means for emitting beam displacement signals indicative of the direction and amount of displacement of said aircraft from beam center when approaching said landing area;

first means for deriving from said beam displacement signal a rate of beam displacement signal;

filter means for providing lagged roll attitude signals from said emitted roll attitude signals, said emitted roll attitude signals being coupled to the input of the filter means;

a roll axis command channel including first summing means for combining said beam displacement signals and said beam rate displacement signals and said lagged roll attitude signals to maintain the aircraft level and on the beam transmitted from the landing area; and a yaw axis command channel including second summing means for combining said yaw rate signal and rate of beam displacement signal, said rate of beam displacement signal being operative in said yaw axis command to turn the aircraft in a direction opposite to any beam deviation by the aircraft.

3. An automatic landing system in accordance with claim 2 and further comprising:

means interconnecting said roll and yaw axis command channels, for applying said beam rate signal of said roll command channel to said second summing means in said yaw axis command channel.

4. An automatic landing control system in accordance with claim 2 and further comprising:

signal emitting means in said aircraft for emitting an electrical signal in response to the displacement error of said aircraft from a selected landing area heading course for said aircraft;

a threshold circuit having a predetermined threshold level and connected to said heading error displacement signal emitting means;

means for applying a portion of said displacement error signal in excess of said predetermined level to said yaw axis summing means only when said aircraft is below a predetermined altitude level above said landing area; and means responsive to touchdown of said aircraft on said landing area for applying the displacement error signal in full strength to said yaw axis summing means.

5. An automatic landing control system in accordance with claim 4 wherein said means for applying a portion only of said displacement error signal comprises:

altitude responsive means and first switch means actuated by said altitude responsive means upon descent of said aircraft to a predetermined altitude for connecting said threshold circuit between said heading error displacement signal emitting means and said yaw axis summing means.

6. An automatic landing control system in accordance with claim 5 wherein said means for applying the displacement error signal in full strength to said yaw axis summing means comprises:

runway contact responsive means;

a by-pass circuit for shorting out said threshold circuit; and said by-pass circuit including second switching means responsive to said runway contact responsive means upon contact of said aircraft with the runway to short out said threshold circuit and to complete a direct connection for said displacement error signal to said yaw axis summing means.

7. An automatic landing control system in accordance with claim 6 and further comprising:

third switching means responsive to said runway contact responsive means upon contact of said aircraft with the runway to complete a connection for direct application of signals from said beam displacement signal emitting means to said yaw axis summing means.

8. An automatic landing control system in accordance with claim 2 and further comprising:

a roll angle limit circuit connected to the output of said roll axis summing means, said limit circuit adapted to pass only roll axis command terms which are less than a predetermined limit value.

9. An automatic landing system for aircraft having an assigned and predetermined roll axis, said system having an aileron controlling signal terminal and being adapted for use in connection with a beam transmitted from a landing area, said system comprising:

first means for summing a beam displacement signal, a rate of beam displacement signal and a filtered roll attitude signal all as derived relative to the aircraft's position with respect to the beam and with respect to its own roll axis;

a roll angle limit circuit connected to said first summing means for passing a roll angle limited signal from said first summing means;

second means connected to said roll angle limit circuit for summing the roll angle limited signal with a directly applied roll attitude signal which is proportional to the amount of deviation of said aircraft from said roll axis;

a roll rate limit circuit connected to said second summing means for passing a roll rate limited signal; and third means for summing the roll rate limited signal with a directly applied roll rate signal proportional to the rate of deviation of the aircraft from its roll axis, said third summing means being connected to said aileron controlling output terminal.

10. An automatic landing system in accordance with claim 9 wherein the aircraft is assigned a predetermined yaw axis and has a rudder controlling signal terminal and wherein said landing system futrher comprises:

fourth summing means for receiving a yaw rate signal proportional to the rate of deviation of said aircraft from its own yaw axis;

first connecting means for applying to said fourth summing means the rate of beam displacement signal applied to said first summing means; and second connecting means coupling said fourth summing means to said rudder controlling signal terminal.

11. An automatic landing system for aircraft having a roll axis control circuit, said landing system to be used in connection with a beam transmitted from a landing area and comprising:

first means for summing a composite electrical roll command signal from a first signal proportional to displacement of said aircraft from said beam, from a second signal proportional to a lagged roll attitude of said aircraft relative to its roll axis, and from a third signal proportional to the rate of beam displacement of said aircraft;

a roll angle limit circuit connected to said first summing means for passing a roll angle limited command;

second summing means connected to said roll angle limit circuit and adapted to receive a directly applied roll attitude signal for modifying said roll angle limited command;

a roll rate limit circuit connected to said second summing means for passing a roll rate limited command;

third summing means connected to said roll rate limit circuit and adapted to receive a directly applied roll rate signal for modifying said roll rate limited command; and means for applying an output signal from said third summing means to a roll axis control means for controlling movements of said aircraft about its roll axis.

12. An automatic landing system in accordance with claim 11 wherein said third beam rate signal is derived from said first beam displacement signal by:

a high pass filter and a low pass filter connected in a tandem circuit and further connected to said first signal summing junction, said tandem circuit being adapted to receive said first beam displacement signal.

13. An automatic landing system in accordance with claim 12 wherein:

the output signal passed by said tandem circuit is an aiding signal relative to said beam displacement signal when said aircraft is on said landing beam path and tends to depart from the landing beam path; and the output signal passed by said tandem circuit is an opposing signal relative to said beam displacement signal when said aircraft has stabilized off the landing beam path and tends to move toward the landing beam path.

14. An automatic landing system in accordance with claim 11 and further comprising:
   means responsive to a yaw rate signal for controlling movements of said aircraft about its yaw axis; and
   means for applying said rate of beam displacement signal derived by said tandem circuit as a stabilizing signal to said yaw axis movement controlling means.

15. An automatic landing control system for aircraft, which system is to be used in conjunction with a transmitting means located on a landing area for emitting electrical signals established along a desired landing beam path by said transmitting means, said aircraft having roll axis control means for controlling movements of said aircraft about a roll axis, and a yaw axis control means for controlling movements of said aircraft about a yaw axis, said landing system comprising in said roll axis control means:
   first signal emitting means for emitting a first electrical signal in response to the lateral deviation of said aircraft from said desired path established by said transmitting means;
   second signal emitting means for emitting a second electrical signal proportional to the displacement of said aircraft from a predetermined roll attitude along a roll axis of said aircraft;
   a first signal summing junction;
   a second signal summing junction connected to the first summing junction;
   means applying said first lateral deviation signal directly to said first summing junction;
   rate circuit means connected to said first signal emitting means for applying a signal proportional to the rate of lateral deviation to said first summing junction;
   means applying said second roll attitude signal directly to said second summing junction;
   a low pass filter connected to said second signal emitting means and having a time-constant selected to provide a lagged roll attitude signal;
   means supplying said lagged roll attitude signal to said first summing junction for detracting from the effect of said first signal applied thereto;
   a third summing junction;
   a roll rate limit circuit connected between said second and third summing junctions;
   means applying the output of said third summing junction to said roll axis control means for actuating said control surface in a direction to hold said aircraft on said desired landing path; said landing system further comprising in said yaw axis control means:
   (a) third signal emitting means for emitting a third electrical signal proportional to the rate of displacement of said aircraft about its yaw axis;
   (b) a fourth signal summing junction connected to said yaw rate signal emitting means; and
   (c) means connected between said fourth signal summing junction and said rate circuit for applying said beam rate deviation signal as a stabilizing term to said yaw axis control means.

16. An automatic landing system in accordance with claim 3 wherein said interconnecting means comprises:
   a direct path for applying said beam rate signals in full strength to said yaw axis command channel.

17. An automatic landing system in accordance with claim 3 wherein said interconnecting means comprises:
   a limit circuit for applying only said beam rate signals below a predetermined level to said yaw axis command channel.

18. An automatic landing system in accordance with claim 16 wherein large beam rate signals tend to induce excessive rudder activity in said yaw axis command signal, said landing system further comprising:
   a selectively operable switch means normally closed in said direct path and operable in the presence of said excessive rudder activity; and
   a limit circuit connected to said direct path in parallel with said switch means, said limit circuit having a predetermined level for passing only beam rate signals to said yaw axis command channel below said predetermined level.

References Cited

UNITED STATES PATENTS

| | | | |
|---|---|---|---|
| 2,987,276 | 6/1961 | Osder et al. | 244—77 |
| 3,120,934 | 2/1964 | Robertson | 244—77 |
| 3,136,502 | 6/1964 | Auld et al. | 244—77 |

FERGUS S. MIDDLETON, Primary Examiner

U.S. Cl. X.R.

318—489; 343—108